United States Patent [19]

Clarizio

[11] 4,315,062
[45] Feb. 9, 1982

[54] METHOD FOR THE MANUFACTURE OF A POLYSTYRENE SEPARATOR AND CELL

[75] Inventor: Donald M. Clarizio, Yonkers, N.Y.

[73] Assignee: Duracell International Inc., Bethel, Conn.

[21] Appl. No.: 870,049

[22] Filed: Jan. 16, 1978

[51] Int. Cl.³ .............................................. H01M 2/16
[52] U.S. Cl. .................................... 429/246; 29/623.5; 427/58
[58] Field of Search ....................... 429/246, 253, 254; 29/623.1–623.5; 427/58

[56] References Cited

U.S. PATENT DOCUMENTS

| | | | |
|---|---|---|---|
| 2,297,248 | 9/1942 | Rudolph | 429/254 X |
| 2,673,230 | 3/1954 | Brennan | 429/254 X |
| 2,810,775 | 10/1957 | Raphael et al. | 429/254 X |
| 2,816,154 | 12/1957 | Mendelsohn | 429/145 |
| 3,228,802 | 1/1966 | Rabl | 429/145 |
| 3,922,226 | 11/1975 | Entwisle | 429/253 X |

Primary Examiner—Charles F. LeFevour
Attorney, Agent, or Firm—Ronald S. Cornell; Israel Nissenbaum

[57] ABSTRACT

A method of forming a polystyrene separator for use in an electrochemical cell comprising the steps of dissolving the polystyrene resin in a solvent, placing a predetermined amount of the resulting polystyrene solution directly on the surface of a cathode, and removing the solvent thereby leaving a substantially continuous coating on the surface of the cathode.

11 Claims, No Drawings

METHOD FOR THE MANUFACTURE OF A POLYSTYRENE SEPARATOR AND CELL

The present invention relates to polystyrene separators used in electrochemical cells and more particularly to a method for forming a polystyrene separator directly on the cathode surface of an electrochemical cell.

The function of separators in electrochemical cells is to prevent direct electrical interaction engendered by contact between anode and cathode. This electrical interaction between anode and cathode internally self-discharges the cell and shortens the life of the cell. A separator is accordingly positioned between the anode and cathode in order to prevent such self-discharge. Although the separator prevents physical electrical bridging between anode and cathode it must be ionically permeable in order to allow ionic flow therethrough. Electrochemical reactions may thus proceed and the cell can properly function. Thus, separators are porous and in some instances actually retain the ionically conductive electrolyte of the cell therein to facilitate ionic flow. Occasionally separators consist of several layers with one of the layers functioning to retain the electrolyte.

Electrical bridging between anode and cathode may also occur when electrically conductive electrochemical reaction products are produced by the cell. These by-products tend to migrate between anode and cathode and containment of such migration is a further function of the separator. In order to properly function in this manner, the separator must maintain its structural integrity during substantially the entire practical lifetime of the cell. Thus, for example, in cells having either mercury (II) oxide or silver oxide cathodes, the separators therein must maintain sufficient structural integrity to either contain the flow of highly mobile mercury metal by-products or physically prevent dendritic silver by-products from forming anode—cathode bridges.

Various materials such as cellophane have been used as separators and work well in cells that are not subject to long periods of storage. These separator materials slowly react with the alkaline electrolyte present in many cells. Thus, on the prolonged storage of alkaline cells, the presence of cellophane, or other degradable separator materials shorten the life of the cell in which it is contained.

Polystyrene is a material that does not degrade in the presence of alkaline inorganic electrolytes such as potassium hydroxide, which is the chief electrolyte in alkaline cells. Separators made of a polystyrene sheet have not heretofore been used since polystyrene is normally a poor conductor of ions. Polystyrene has previously been used as a separator only in a fiber or foam form, or as a binder for other fibers.

DESCRIPTION OF THE INVENTION

A method has now been discovered that enables formation of a substantially continuous layer of polystyrene that is capable of permitting ion transport. This method comprises dissolving a quantity of polystyrene resin in a solvent, applying the resulting solution directly to the cathode, and removing the solvent to form a thin adhered layer of polystyrene on the cathode surface. The polystyrene layer adheres to the cathode, which is opposite that of other cell separators which are items placed into the cell and only held against the cathode.

Solvents that are suitable for dissolving the polystyrene resin will be volatile to facilitate their removal, but they must not be capable of dissolving the materials from which the cathode is formed. Suitable solvents include methylene chloride, tetrahydrofuran, ethyl acetate, acetone, benzene, toluene, and trichloroethylene.

The polystyrene solution is applied directly to the cathode surface, and must be in sufficient volume to cover the entire exposed surface of the cathode. Methods of application may vary, and there are many mechanical dispensing devices that can be used to apply a metered amount of polystyrene solution automatically. The amount of polystyrene in the metered amount of solution applied to the cathode surface must be adequate so that, when the solvent is removed, as by evaporation, a substantially continuous coating of polystyrene is formed on the surface of the cathode. Concomitantly, the quantity of polystyrene present must exceed that amount which will form a film of a thickness that permits adequate ionic movement therethrough and which film will not be so thick as to be subject to cracking.

The thickness of the polystyrene coating can be controlled by varying the concentration of polystyrene in the solution, the quantity of solution applied, and the number of layers formed. The useful ratio of polystyrene to solvent is determined by the type of solvent use, the desired thickness of the final layer, and the viscosity of the desired solution. The useful ratio will desirable be within the range of up to about 100 grams of polystyrene resin per liter of solvent. Preferably, the amount of polystyrene will be up to 25 grams per liter, with the most preferred range of between 0.5 and 7.5 grams per liter.

Initial application of a thick layer cannot be accomplished due to the tendency of such layers to crack. After the solvent has been removed and the initial thin layer of polystyrene is formed, however, the process can be repeated to thicken the layer by forming one or more additional layers or, alternatively, dissolving the initial layer and forming a new, thicker layer. Repeating the steps of the process of the present invention permits almost unlimited control over the final thickness of the separator. Such control is not feasible where the separator is a prefinished item available only in standard thicknesses, and merely inserted during the manufacture of an electrochemical cell.

Changing the separator thickness changes resistivety and impedance. The impedance of an electrochemical cell is one factor in determining the rate of discharge of the cell. The lower the impedance, the higher the current produced during discharge and the faster the cell discharges. Heretofore, it has been difficult to easily change the impedance of a given cell. The use of the process of the present invention allows the impedance of a cell to be easily and accurately changed simply by changing the separator thickness in the manner described above.

Since polystyrene is a very rigid material, it may crack on the expansion of the cathode to which it adheres. The structural strength and resistance to migration of reaction by-products of the polystyrene separator can be increased by placing reinforcing means on the surface of the cathode before or after applying the polystyrene solution. The combination of reinforcing means and polystyrene is formed directly on, and adheres to, the cathode surface. The reinforcing means, since it contains many small pores, substantially aids in the prevention of cracking of the separator and aids in the containment of the cracked separator and of reaction by-products, such as metallic mercury, on the cathode if the separator does crack.

The reinforcing means must be porous or microporous so that the dissolved polystyrene can penetrate into and through the means to make contact with the cathode. The means must also be sufficiently flexible so that it will retain its physical properties and the reaction by-products when the cathode expands. The means can include both woven and nonwoven polypropylene, nylon, polyethylene and polyvinyl chloride felts. Cellusosic materials, such as cotton felts and microporous materials such as polyvinyl chloride, polyethylene, and polytetrafluroethylene sheets can also be used as reinforcing means. The means should have a thickness within the range of between about 0.002 and 0.04 centimeter.

The reinforcing means does not have to be completely resistant to the solvent used to dissolve the polystyrene. The solvent is in contact with the reinforcing means for a very short time, only while the solvent is evaporating. Any softening or partial dissolution of the means will be beneficial, allowing the polystyrene to better adhere to it.

One specific useful reinforcing means is a woven nylon membrane with a foamed coating of polyvinyl chloride, acrylonitrite, and finely ground acid ion exchange resin. Such membranes are sold under the trademark "Acropor 4602."

The following example is given to illustrate the construction and efficacy of the present invention. In the example, as well as throughout the specification and claims, all parts are parts by weight and all volumes are at room temperature.

EXAMPLE 1

A cathode containing mercuric (II) oxide, having a thickness of 0.11 centimeter and a diameter of 2.3 centimeters was incorporated into a battery can having a diameter of 2.5 centimeters. Onto the cathode 0.5 cubic centimeter of a solution containing one gram of polystyrene dissolved in twenty millileters of trichloroethylene was dispensed. The solvent was evaporated and a separator was formed which adhered directly to the cathode. A layer of absorbent material, herein a mat of cotton, was placed over the separator and 0.8 cubic centimeter of an electrolyte containing potassium hydroxide was added to the absorbent. An anode containing zinc and having a diameter of 1.8 centimeters and a thickness of 0.19 centimeter was then incorporated into the cell can. After the can was sealed with a grommet and top, the can had a height of 0.55 centimeter.

The cell was stored at a temperature of about 45° C. for six months, and then discharged at room temperature. The cell showed normal capacity on discharge. On opening and examination of the cell, it was found that the separator appeared new. When the separator was pierced with a metal probe, the trapped elemental mercury oozed out from the probe holes in the separator.

EXAMPLE 2

A cathode containing mercuric (II) oxide, having a thickness of 0.17 centimeter and a diameter of 1.2 centimeters was incorporated into a battery can having a diameter of 1.5 centimeters and a height of 0.56 centimeter. A disc of "Acropor" of the same diameter as the cathode and 0.01 centimeter thickness was placed on the cathode. Onto this disc, ten microliters of a solution containing twenty milligrams of polystyrene dissolved in ten milliliters of methylene chloride was dispensed. The solvent was evaporated and a separator was formed which adhered directly to the cathode. A layer of absorbent material, herein a mat of cotton, was placed over the separator and 0.25 cubic centimeter of an electrolyte containing potassium hydroxide was added to the absorbent. An anode containing zinc, with a diameter of 0.91 centimeter and a thickness of 0.22 centimeter was then incorporated into the battery can. After the can was sealed with a grommet and top, the can had a height of 0.59 centimeter.

After storage of the battery, the cell was discharged at room temperature. On opening and examining the cell, it was found that the separator had cracked, but the polystyrene in combination with the "Acropor 4602" had prevented any migration of mercury from the cathode. The separator was found not to have been affected by the alkaline electrolyte.

The preceding examples are intended to be for illustrative purposes only. It is understood that changes and variations can be made without departing from the spirit and scope of the present invention as defined in the following claims.

What is claimed is:

1. A method of forming a separator for use in an electrochemical cell comprising the steps of dissolving polystyrene resin in a solvent, placing a predetermined amount of the resulting polystyrene solution directly on the exposed surface of a cathode, and removing said solvent thereby leaving a thin, substantially continuous coating on the exposed surface of said cathode.

2. The method of claim 1 and further comprising the step of placing a reinforcing means on said surface of said cathode and applying said solution.

3. The method of claim 2 wherein the material of the reinforcing means is selected from the group consisting of woven and nonwoven polypropylene, nylon, polyethylene, polyvinyl chloride, and cotton material; and microporous polyvinyl chloride, polyethylene and polytetrafluoroethylene sheets.

4. The method of claim 3 wherein the reinforcing means is woven nylon.

5. The method of claim 1 wherein said solvent is selected from the group consisting of methylene chloride, tetrahydrofuran, ethyl acetate, acetone, benzene, toluene, and trichloroethylene.

6. The method of claim 1 wherein up to 100 grams of polystyrene resin are dissolved per liter of solvent.

7. The method of claim 6 wherein up to 25 grams of polystyrene resin are dissolved per liter of solvent.

8. The method of claim 7 wherein between about 0.5 gram to about 7.5 grams of polystyrene resin are dissolved per liter of solvent.

9. The method of claim 1 wherein said cathode is selected from the group consisting of mercury (II) oxide and silver oxide.

10. The method of claim 1 wherein the steps of placing a predetermined amount of the polystyrene solution on the surface of said cathode and removing said solvent are repeated whereby an ionically permeable separator of greater thickness is formed.

11. An electrochemical cell comprising an anode, a cathode and a polystyrene separator formed by the method of claim 1, said separator being positioned between and completely separating said cathode and said anode whereby it prevents the migration therethrough of reaction products of said cathode and said anode.

* * * * *